United States Patent
Zavesky et al.

(10) Patent No.: US 11,657,852 B1
(45) Date of Patent: May 23, 2023

(54) SYSTEM AND METHOD FOR CONTEXTUAL SYNTHETIC MEDIA GENERATION

(71) Applicant: AT&T Intellectual Property I, L.P., Atlanta, GA (US)

(72) Inventors: Eric Zavesky, Austin, TX (US); James H. Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/679,844

(22) Filed: Feb. 24, 2022

(51) Int. Cl.
*G11B 27/031* (2006.01)
*G06V 20/40* (2022.01)
*H04N 21/266* (2011.01)
*G06V 20/50* (2022.01)
*H04N 21/234* (2011.01)
*G06V 40/16* (2022.01)

(52) U.S. Cl.
CPC ............ *G11B 27/031* (2013.01); *G06V 20/41* (2022.01); *G06V 20/50* (2022.01); *G06V 40/172* (2022.01); *H04N 21/23418* (2013.01); *H04N 21/266* (2013.01)

(58) Field of Classification Search
CPC .... G11B 27/031; G06V 40/172; G06V 20/41; G06V 20/50; H04N 21/23418; H04N 21/266
See application file for complete search history.

(56) References Cited

U.S. PATENT DOCUMENTS

| | | | |
|---|---|---|---|
| 10,810,324 B2 | 10/2020 | Zavesky et al. | |
| 2011/0013087 A1* | 1/2011 | House | G11B 27/28 348/E5.099 |
| 2018/0063558 A1* | 3/2018 | Stefanidis | H04N 21/26258 |
| 2020/0160502 A1 | 5/2020 | Nießner et al. | |
| 2020/0322647 A1* | 10/2020 | Zheng | H04N 21/8549 |
| 2020/0327310 A1 | 10/2020 | Palmer | |
| 2020/0402342 A1 | 12/2020 | Kelly et al. | |
| 2021/0042529 A1* | 2/2021 | Price | G06V 40/171 |
| 2021/0174487 A1 | 6/2021 | Nießner et al. | |
| 2021/0209388 A1* | 7/2021 | Ciftci | G06V 10/764 |
| 2021/0224596 A1 | 7/2021 | Mcdevitt | |
| 2021/0236936 A1 | 8/2021 | Tureaud et al. | |
| 2021/0273811 A1 | 9/2021 | Burke | |
| 2022/0012362 A1 | 1/2022 | Kuta et al. | |

* cited by examiner

*Primary Examiner* — Sunghyoun Park
(74) *Attorney, Agent, or Firm* — Guntin & Gust, PLC; Ralph Trementozzi

(57) ABSTRACT

Aspects of the subject disclosure may include, for example, obtaining, at a first location, media content capturing an event occurring at a capture location. The media content is analyzed proximal to the first location to obtain an analysis result, a context of the event is determined, and a rule is applied according to the context to obtain a rule application. The media content is modified according to the rule application to obtain a modified media content adapted for distribution to a media consumer at a second location, while preventing distribution of the media content for consumption by the media consumer. Other embodiments are disclosed.

20 Claims, 9 Drawing Sheets

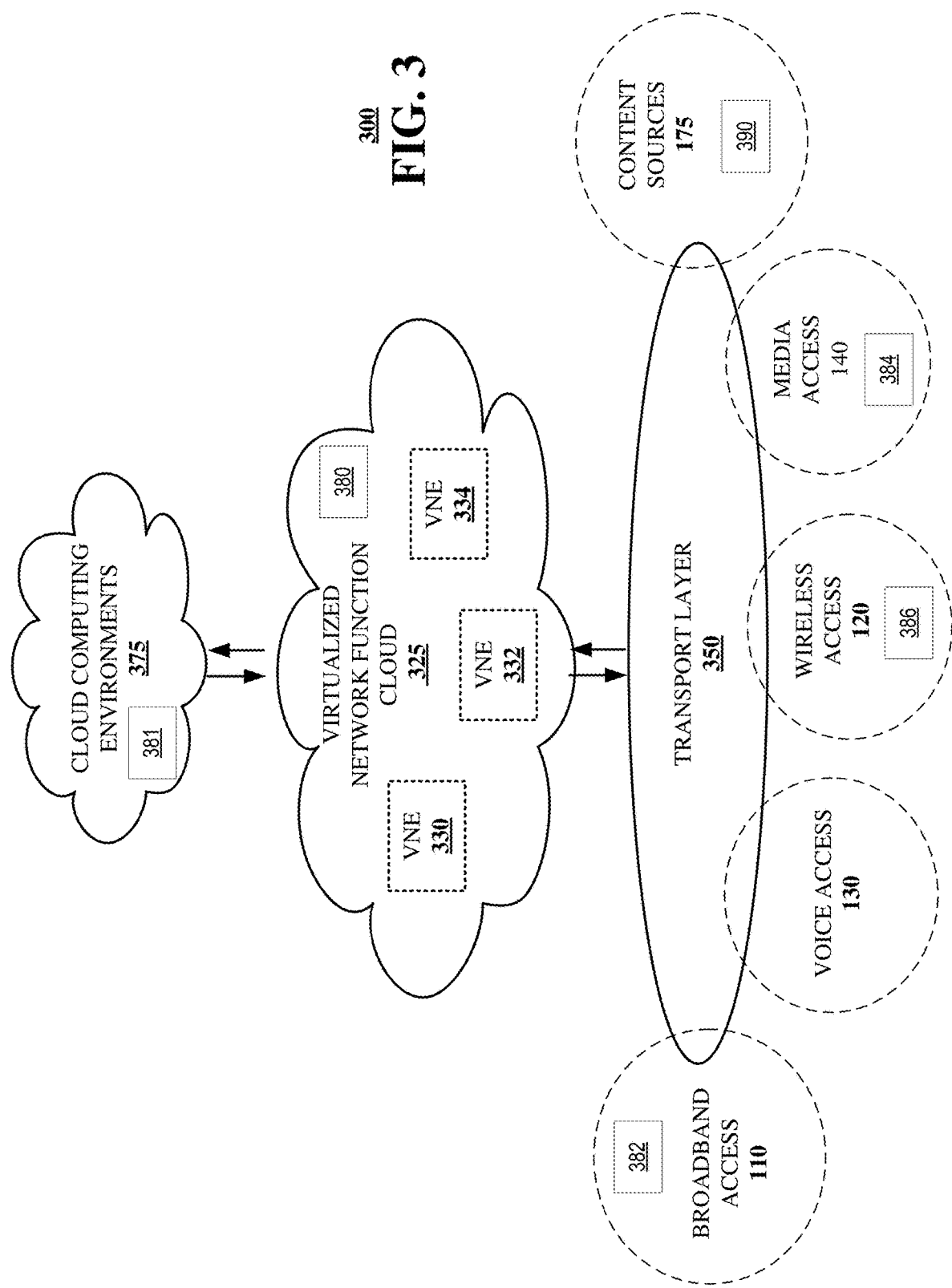

SYSTEM AND METHOD FOR CONTEXTUAL SYNTHETIC MEDIA GENERATION

FIELD OF THE DISCLOSURE

The subject disclosure relates to a system and method for contextual synthetic media generation.

BACKGROUND

Synthetic media generally refers to the artificial production, manipulation, and modification of data and media by automated means, especially through the use of artificial intelligence algorithms. Such synthetic content is often referred to as a "deepfake"—a term derived from the combination of "deep learning" and "fake" meaning "not true." For example, a face of one subject in an image may be swapped with a face of another, sometimes referred to as "FaceSwap."

Deepfake adopts techniques from machine learning and artificial intelligence to manipulate and/or generate visual and/or audio content with a high capability/probability to deceive. To this end, machine learning techniques may be used to create deepfakes based on deep learning that involves training generative neural network architectures. Such neural networks may be leveraged to generate synthetic content in which a subject, e.g., a person, in an existing image or video is replaced with another's likeness. For example, face swapping technology may use autoencoder and decoder pairs in which an autoencoder extracts features of a facial image and a decoder reconstructs the facial image.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
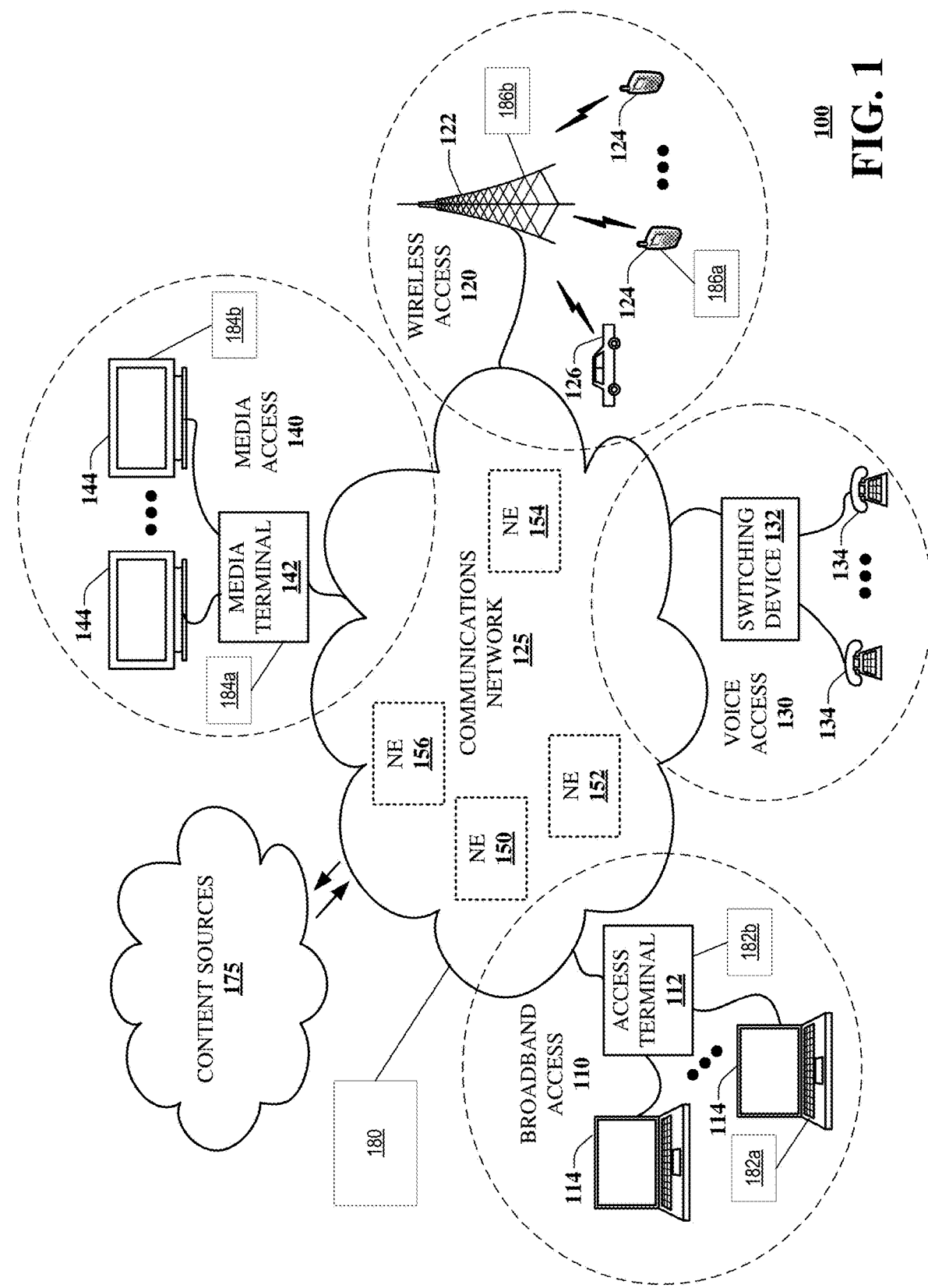
FIG. 1 is a block diagram illustrating an exemplary, non-limiting embodiment of a communications network in accordance with various aspects described herein.

The subject disclosure describes, among other things, illustrative embodiments for synthetic media generation according to contextual information. Other embodiments are described in the subject disclosure.

One or more aspects of the subject disclosure include a process that includes recording, by a processing system including a processor at a first location, original media content of a live event, analyzing, by the processing system, the original media content proximal to the first location to obtain an analysis result, and identifying, by the processing system, a context of the live event. The process further includes applying, by the processing system, a rule proximal to the first location according to the context to obtain a rule application, modifying, by the processing system, the original media content proximal to the first location according to the rule application to obtain modified media content adapted for distribution to media consumers, and preventing, by the processing system, distribution of the original media content for consumption by the media consumers.

One or more aspects of the subject disclosure include a media processing system, which includes a processing system including a processor and a memory that stores executable instructions that, when executed by the processing system, facilitate performance of operations. The operations include generating, at a source location, media content capturing an event occurring at the source location, analyzing the media content proximal to the source location to obtain an analysis result and identifying a context of the event. The operations further include applying a rule proximal to the source location according to the context to obtain a rule application, modifying the media content proximal to the source location according to the rule application to obtain modified media content adapted for distribution to media consumers, and preventing distribution of the media content to the media consumers.

One or more aspects of the subject disclosure include a non-transitory, machine-readable medium, that includes executable instructions that, when executed by a processing system including a processor, facilitate performance of operations. The operations include obtaining, at a first location, media content capturing an event occurring at a capture location, analyzing the media content proximal to the first location to obtain an analysis result, and determining a context of the event. The operations further include applying a rule according to the context to obtain a rule application, wherein the media content is modified according to the rule application to obtain a modified media content adapted for distribution to a media consumer at a second location, and preventing distribution of the media content for consumption by the media consumer.

It is appreciated that media content generation, such as user-based content upload, may accidentally capture someone and/or something who should not be seen, e.g., according to their personal preference, a user preference, and/or any laws and/or regulations, such as child privacy laws, security, e.g., corporate security, and so on. Consider crowd-based scenarios with an expectation of privacy, but camera captures crowd, e.g., at a celebrity party. Other examples include wartime reporting that inadvertently capture someone/something, e.g., disclosing personal identity that may endanger the person. On-the-spot reporting, e.g., timely news, is often accomplished by lightweight reporting teams with limited editing and/or production capacity that would make it unfeasible to have immediate and/or local access a full production facility.

Some of the example solutions to such problems disclosed herein include applications of contextual synthetic media generation, including image modification that utilizes convincing image replacement segments, e.g., "deepfakes," implemented as close as possible to the media source, without necessarily requiring corresponding compute power at the source. To this end, the processing may be accomplished at media capture equipment, and/or as nearby as practical, e.g., providing resources that are no more than "one hop" up the network path, e.g., at a point-of-entry cell tower, or further up the network, e.g., at an edge node, but preferably before content is edited and/or published, to protect identities.

The convincing image replacement approaches, when applied to the foregoing situations, yield positive results, intended to appear convincing to a content consumer in that the results look real and are not detectable as replacements, in order to preserve rights of privacy of persons, places and/or things that may be captured in the media content. Examples of convincing image replacement segments include face swapping that may be used to make one face look like another. Alternatively or in addition, the convincing image replacement segments may include aspects of puppeteering by which a replacement face is adapted to conform to actions, e.g., head movement, expressions and/or speech, e.g., lip-syncing of the face being replaced.

Referring now to FIG. 1, a block diagram is shown illustrating an example, non-limiting embodiment of a system 100 in accordance with various aspects described herein. For example, system 100 can facilitate in whole or in part obtaining, at a first location, media content that captures an occurrence of an event, analyzing the media content proximal to the first location to obtain an analysis result, determining a context of the event, applying a rule according to the context to obtain a rule application, modifying the media content according to the rule application to obtain a modified media content adapted for consumption by a media consumer at a second location, and preventing distribution of the media content for consumption by the media consumer. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, one or more of the data terminals 114 and/or the access terminal 112 at a first location may include a module, application and/or executable instructions 182a, 182b, adapted for obtaining media content, and/or analyzing the media content, and/or determining a context of an event portrayed in the media content, and/or applying a rule according to the context, and/or modifying the media content according to the rule, and/or preventing distribution of the media content for consumption by a media consumer at a second location remote from the first location. Likewise, in at least some embodiments, one or more of the display devices 144 via media terminal 142 at a first location may include a module, application and/or executable instructions 184a, 184b, adapted for obtaining media content, and/or analyzing the media content, and/or determining a context of an event portrayed in the media content, and/or applying a rule according to the context, and/or modifying the media content according to the rule, and/or preventing distribution of the media content for consumption by a media consumer at a second location remote from the first location. Similarly, in at least some embodiments, one or more of the mobile devices 124, 126 and/or access points 122 at a first location may include a module, application and/or executable instructions 186*a*, 186*b*, adapted for obtaining media content, and/or analyzing the media content, and/or determining a context of an event portrayed in the media content, and/or applying a rule according to the context, and/or modifying the media content according to the rule, and/or preventing distribution of the media content for consumption by a media consumer at a second location remote from the first location.

According to the illustrative example, the system 100 may include a media processor 180 in communication with one or more of the data terminals 114, the access terminal 112, the display devices 144, the media terminal 142, the mobile devices 124, 126 and/or the access points 122 via the communications network 125. The media processor 180 may be adapted to perform one or more of the processing steps disclosed herein in relation to processing of media content to determine a context of the media content, applying a rule according to the context, modifying the media content according to the application of the rule, and preventing a distribution of the unmodified media content. To this end, the media processor 180 may perform at least a portion of the processing steps that are distributed among another media processor, which may include one or more of the network elements 150, 152, 154, 156, and/or one or more of the data terminals 114, the access terminal 112, the display devices 144, the media terminal 142, the mobile devices 124, 126 and/or the access points 122 via the communications network 125.

Figure 2A:
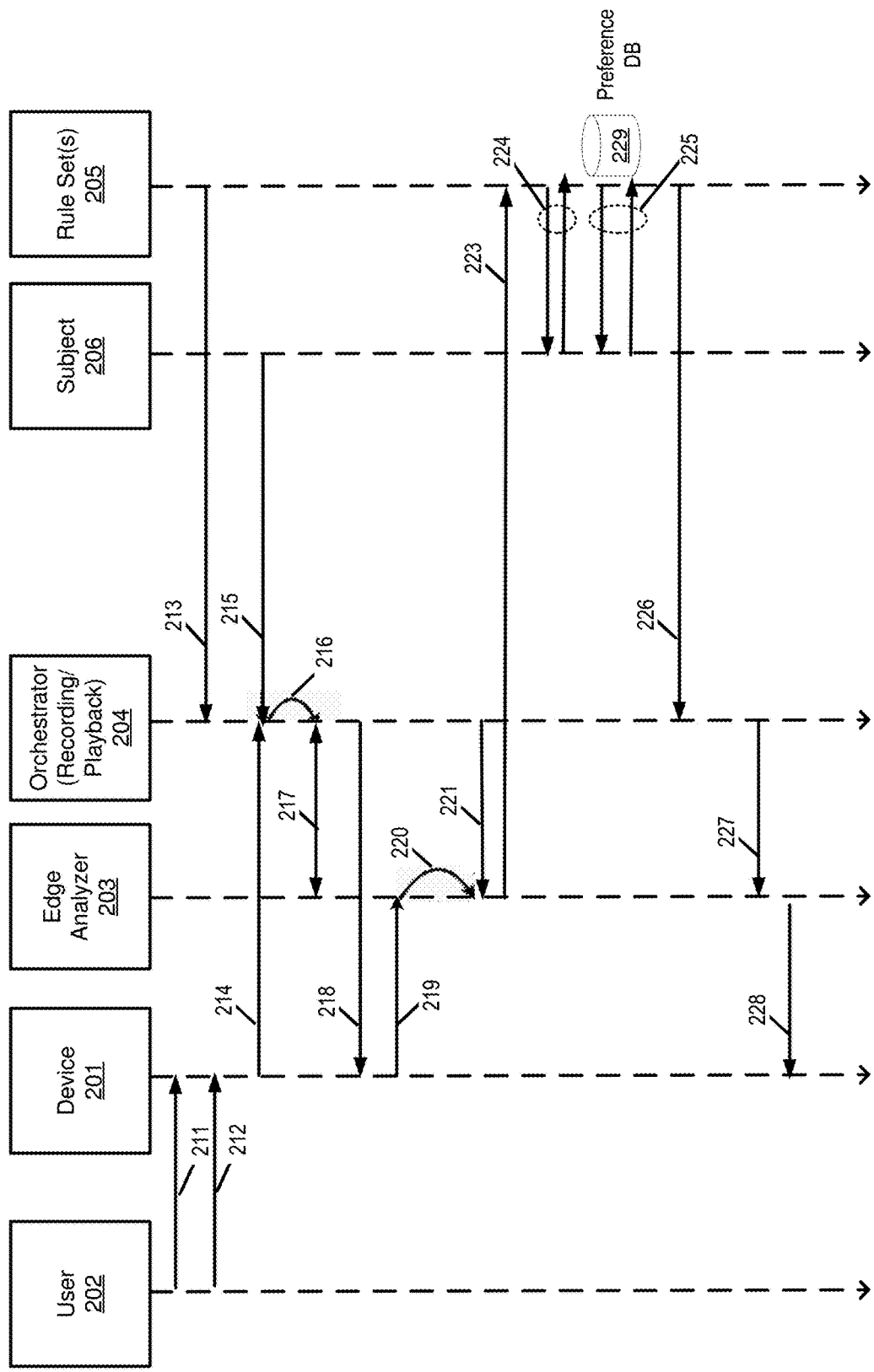
FIG. 2A is a schematic diagram illustrating an example, non-limiting embodiment of interactions occurring within a contextual synthetic media generation system functioning within the communication network of FIG. 1 in accordance with various aspects described herein.

FIG. 2A is a schematic diagram illustrating an example, non-limiting embodiment of interactions occurring within a contextual synthetic media generation system 200 functioning within the communication network of FIG. 1 in accordance with various aspects described herein. The contextual synthetic media generation system 200 includes a device 201, an edge analyzer 203, an orchestrator 204 and one or more rule sets 205. The example device 201 is in communication with the edge analyzer 203, which is in further communication with the orchestrator 204. The orchestrator 204, in turn, is in further communication with the one or more rule sets 205. In at least some embodiments, the one or more rule sets 205 may be stored according to a rule file or script repository. Storage of the one or more rule sets 205 may be accomplished locally, e.g., proximal to one or more of the device 201, the edge analyzer 203 and/or the orchestrator 204. Alternatively or in addition, at least a portion of the one or more rule sets 205 may be stored remotely and accessible via network communications, e.g., as an accessible rule repository or database.

The device 201 may be adapted to perform one or more of receiving, capturing, retrieving from storage, storing, transmitting, and/or displaying media content. The media content may include, without limitation, one or more of digital images, video, computer generated imagery (CGI), and/or audio. Alternatively or in addition, the device 201 may include a media recording device, such as a digital camera, a video camera, an audio recorder, a digital video recorder (DVR), and the like. Alternatively or in addition, the device 201 may include a media player adapted to access pre-recorded media content for presentation via a display device and/or an audio player as one or more of still images, video images or audio. In at least some embodiments, the device 201 may include a game console and/or a game controller as may be manipulated by the user 202 during gameplay. In at least some embodiments, the device 201 may include a smart phone, a smart television, a personal computer, a tablet device, and so on.

The edge analyzer 203 may be adapted to analyze one or more of the digital images, video, computer generated imagery (CGI), and/or audio received and/or otherwise accessed by the device 201. The edge analyzer 203 may be employed wholly or at least partially proximal to the device 201. In at least some embodiments, the edge analyzer 203 may be incorporated into a media capture device, such as a camera, a video camera, a smart phone, a tablet, and the like. For example, the edge analyzer 203 may include an application program or app that may be stored and/or otherwise executed locally at and/or near the device 201. Alternatively or in addition, the edge analyzer 203 may be provided as a service, e.g., having local and/or back-end functionality that may be accessible via a network connection.

According to at least some configurations, the edge analyzer 202 may be implemented at, near or within a device in network communication with one or more of the device 201, the orchestrator 204 and the one or more rule sets 205. For example, the edge analyzer 203 may be implemented at, near or within a processing device, such as a server, as may be accessible by the device 201 using a wired and/or wireless local area network. Alternatively or in addition, the edge analyzer 203 may be implemented at least partially within a wireless access point and/or a business or residential gateway. In at least some embodiments, the edge analyzer 203 may be implemented at, near or within local equipment servicing a cellular communication terminal, e.g., a radio access network and/or a base transceiver station. Alternatively or in addition, at least a portion of the edge analyzer 203 may be located at, near or within an edge node of a service provider network. According to any of the illustrative examples, an analysis performed by the edge analyzer 203 of media content obtained by the device 201 may be performed proximal to the device 201, e.g., before network transport of the media content to a destination, such as a media editing and/or production facility, a media storage facility, and/or before broadcast and/or dissemination of the media content to any consumers of the media content. It is understood that in at least some applications, it is preferable to apply any modifications and/or adaptation of media content as close as practical to the source to prevent and/or otherwise limit the possibility of unauthorized access to any unmodified media content.

In operation, the edge analyzer 203 may employ one or more analysis techniques to interpret at least a portion of the media content. For example, an image, such as a video frame, may be analyzed to identify one or more subjects of the media content discernable according to presentation of the media content. Subjects may include objects, e.g., persons, places, things, may be discernable within a presentation of an image according to image analysis tools, e.g., object and/or facial recognition. Alternatively or in addition, objects may be discernable according within an audio presentation, e.g., according to a sound characteristic and/or voice signature or profile.

In at least some embodiments, the analysis techniques may parse an image of the media content into segments that may be representative of one or more objects of a scene portrayed within the image. In at least some embodiments, the analysis may categorize the one or more objects, e.g., identifying them as people, faces, animals, inanimate objects, such as clothing, logos, brands, monikers. Analysis techniques may further distinguish a foreground portion of an image from a background portion of the image, e.g., associating one or more of the objects with the foreground or the background, as interpreted. In at least some embodiments in which the objects include people, the analysis techniques may further distinguish and/or otherwise estimate a person's gender, approximate age, race, ethnicity, nationality, employment, group affiliation, and so on. Still further, analysis techniques may identify a person's position, posture, and/or action, and in at least some instances interpret the person's mood and/or intent, e.g., according to body language.

Without limitation, analysis may include encoding at least a portion of the media content, e.g., at least a portion of an image, a video frame, three-dimensional (3D) images and/or video, such as those represented according to voxels, and/or audio, to obtain an encoding. The encoding may be analyzed further utilizing aspects of artificial intelligence, e.g., machine learning.

In at least some embodiments, the orchestrator 204 may be adapted to facilitate adaptation and/or modification of the media content according to at least one rule of the one or more rule sets 205. Adaptation may include, without limitation, a substitution, e.g., replacement, of at least a portion of the media content with a substitute portion, such as replacement of an entire person, a subject's face, hair, and/or an article(s) of clothing of a subject portrayed within an image and/or a video portion of the media content. Any such substitution or replacement may be performed in a convincing manner, such that the modified media content would be indistinguishable to any subsequent consumer of the modified media content from the original media content, but for the substitution.

In at least some embodiments, the orchestrator 204 adopts techniques from machine learning and/or artificial intelligence to manipulate and/or generate visual and/or audio content with a high capability and/or probability to be convincing or otherwise not detectable as a replacement. For example, the orchestrator 204 may include one or more auto-encoder and/or decoder pairs. The autoencoder is adapted to extract features of an image, such as dormant features of facial image, whereas the decoder is adapted to reconstruct the image, e.g., the facial image.

Examples of such adaptations that include convincing image replacement segments are sometimes referred to as "deepfakes" in which artificial media is used to replace a person's face obtained from an image or a video with a face of another person. Accordingly, a convincing image replacement segments is a method that digitally swaps a face of one subject in an image with another, sometimes referred to as "Face Swap." For example, a face of an adult female may be replaced with a distinguishable face of another adult female. The other adult female may be a recognizable figure, e.g., a person of some notoriety, such as a celebrity, a politician, or a historical figure. Alternatively or in addition, the distinguishable face may be a machine generated face, e.g., constructed according to an algorithm, adapted to provide certain realistic features that are distinguishable from the original face, such as complexion, eye color, shape, proportion, hair color, style, and the like. It is understood that in at least some instances the original and replacement faces may differ in one or more of gender, race, ethnicity, age, and the like, such that a face of a white male adult, may be replaced with the face of an adult female of color.

In some embodiments, the orchestrator 204 generates a replacement portion of the media content based on one or more original portions of the media content. For example, a replacement face for a face swap of one subject within a scene of an image and/or video may be generated according to one or more features of a face or faces of other individuals also portrayed within the same scene. Thus, the orchestrator 204 may generate the replacement face to adapt an otherwise distinguishable subject into a crowd or setting. Likewise, the orchestrator 204 may generate a replacement face to further distinguish an otherwise indistinguishable subject within the scene.

In at least some embodiments, the orchestrator 204 may obtain analysis results of the media content from the edge analyzer 203. Analysis results may include a description and/or assessment of one or more portions of the media content, such as one or more portions of the image. The assessment may include an indication of a background portion of an image and/or video, e.g., an assessment of another subject or subjects, e.g., a crowed, within which a subject was captured within the image and/or video. The assessment may include a description and/or characterization of the other subject(s), e.g., providing estimates of one or more of genders, races, ethnicities, ages, and the like. Alternatively or in addition, the assessment may include encoded information as may have been obtained using AI techniques, e.g., a deep neural network, directed towards the other subject, crowd and/or background.

In addition to replacing a face of one person with another, the adaptation, e.g., face swapping, techniques disclosed herein may also be adapted to manipulate other features, such as a subject's position, posture, facial expression, and so on. It is further understood that one or more of the various adaptation techniques may be applied to audio, e.g., convincing audio replacement segments, permitting post-production changes to dialogue in a newscast, a movie and/or video without a need for reshoot.

Continuing with an illustrative example, in which the device 201 comprises a video recording device, such as a video camera, and the user 202 represents a person operating the device 201. According to first arrow 211, the user 202 may inform the device 201 of one or more elements of context and/or one or more specific identities of interest. In at least some embodiments, this may occur during a preliminary or pre-recording phase, e.g., according to a configuration or setup procedure. The user 202 may further configure the device 201 for video capture according to second arrow 212. Continuing with the configuration procedure, the orchestrator 204, in turn, may receive one or more rule sets 205 according to arrow 213, e.g., by way of a rule set update obtained from a rule set(s) repository, such as the example preference database 229.

The device 201 having been informed of a context and/or identity of interest may distribute an indication of the same to the orchestrator 204 according to arrow 214. The orchestrator 204 may store one or more of the context and/or identity of interest, which it may provide to the edge analyzer 203 according to arrow 217 for analysis, e.g., to determine whether a subject of interest is present within a scene of the captured video content corresponds to the identity of interest.

Having completed the configuration procedure, the orchestrator 204 may inform the device 201 that it may begin recording, e.g., according to arrow 218. The device 201 may record the video content providing at least a portion of the same to the edge analyzer 203 for analysis. According to the illustrative example, a subject may enter and/or otherwise be present in a scene of the video content, e.g., according to arrow 215. The orchestrator 204 and/or the edge analyzer 203, alone or in combination, may determine, e.g., from an analysis obtained via the edge analyzer 203 according to the information provided by the orchestrator 204, whether the subject who entered the scene corresponds to the identity of interest.

Responsive to an identification of the subject of interest 206 within a scene of the recorded video content, one or more rules of the one or more rule sets 205 may be received and/or applied according to arrows 224, e.g., by the orchestrator 204, which, in turn, may determine at arrow 216, whether the subject 206 is to be recorded and/or modified, e.g., according to the rule set update received according to arrow 213. In this regard, the orchestrator 204 may communicate with the edge analyzer 203, e.g., to determine from an analysis obtained by the edge analyzer 203 whether the subject of interest 206 is present within the scene and/or whether a modification regarding the subject of interest should be applied to the recorded video content before further distribution of the video for editing, publication and/or distribution to end consumers.

In at least some embodiments, the one or more rule sets 205 may identify the subject 206 and/or one or more contexts according to which the subject 206 may be identified. Alternatively or in addition, the one or more rule sets 205 may identify the subject 206 and/or one or more contexts according to which the subject 206 may be modified and/or otherwise obfuscated and/or adapted. To the extent the orchestrator 204 and/or the edge analyzer 203 determines that adaptation is required, the orchestrator determines an adaptation request, e.g., an obfuscate person request. The adaptation and/or obfuscation, e.g., according to arrow 226, may be determined by the orchestrator 204 according to or more adaptation parameters identified according to the one or more rule sets 205. In at least some embodiments, adaptation parameters may be obtained according to arrows 225, from one or more preferences as may be prescribed, e.g., retrievable from a preferences file or preference database 229. Alternatively or in addition, adaptation parameters may be obtained at least in part according to the one or more rule sets 205, e.g., in which at least some of the adaptation parameters may depend upon a predetermined rule and/or policy alone or in combination with one or more of the contexts associated with the recorded video content.

According to arrow 227, the orchestrator 204 may identify and/or request an adaptation, e.g., an obfuscation, of the subject of interest 206 identified within a scene of the recorded video content. An adapted version of the recorded video content is obtained according to arrow 228, e.g., according to one or more of the orchestrator 204, the edge analyzer 203 and/or the device 201. The adapted video content may be disseminated from the device 201, as if it were the originally captured video content, but for the introduced adaptation. Accordingly a recipient of the adapted video content obtained directly from the device 201 may not detect that the video content has been adapted, e.g., according to an obfuscation and/or face swap of the subject of interest 206. Alternatively or in addition, the adapted video content may be disseminated from one or more of the edge analyzer 203 and/or the orchestrator 204, without necessarily requiring that it be provided to the device 201. However, in at least some instances in which the adapted content may be disseminated from one or more of the edge analyzer 203 and/or the orchestrator 204, the adapted video content may also be provided to the device 201, e.g., to provide feedback to the user 202 as to a confirmation that the adaptation has occurred and/or an assurance as to a quality of the adaptation.

It is envisioned that in at least some embodiments, the user 202 may adjust an adaptation responsive to an initial introduction of the adaptation. Such adjustments may be introduced in a manual and/or automated feedback manner to provide adjustments to reduce errors and/or otherwise improve an extent of an adaptation, a quality of the adaptation, and/or a feature of the adaptation.

In at least some embodiments, e.g., after recording has begun according to arrow 281, the edge analyzer 203 may determine a scene change for analysis at arrow 219. The scene change may be identified according to abrupt discernable differences between adjacent video frames or frame segments, according to metadata and/or according to input from the device 201, e.g., a user stops recording, then begins again at a later time. To the extent it is determined at arrow 221 that a screen change may have occurred, the orchestrator 204 may query the edge analyzer 203 regarding an existing and/or otherwise know entity, e.g., any subjects of interest that may have been tracked in the preceding scene and/or to recheck the new scene according to a comprehensive list of subjects of interest. In at least some embodiments, the edge analyzer 203 and/or the orchestrator 204 may consult the one or more rule sets 205 according to arrow 223. Likewise any subjects of interest identified within the new scene may be adapted and/or modified according to one or more rules and/or preferences.

Figure 2B:
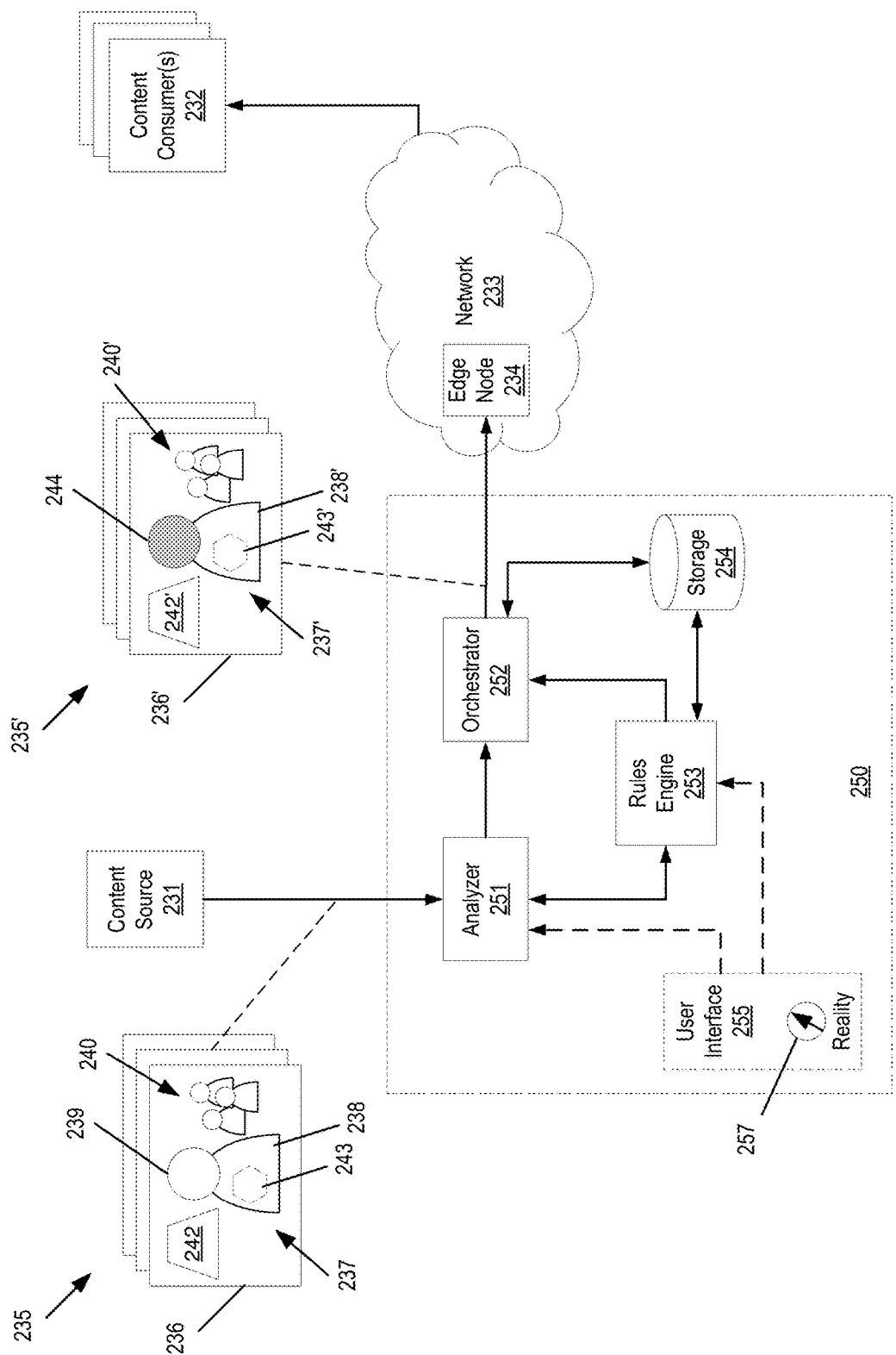
FIG. 2B is a block diagram illustrating an example, non-limiting embodiment of a contextual deep fake generation system functioning within the communication network of FIG. 1 in accordance with various aspects described herein.

FIG. 2B is a block diagram illustrating an example, non-limiting embodiment of a contextual synthetic media generation system 230 functioning within the communication network 100 of FIG. 1 in accordance with various aspects described herein. In at least some embodiments, the contextual synthetic media generation system 230 may operate according to the example interactions occurring within the contextual synthetic media generation system 200 of FIG. 2A. The example contextual synthetic media generation system 230 includes a content source 231, a content processor 250, a content distribution network 233 and one or more content consumers 232. The content source 231 may include any of the example sources provided herein, such as an example digital camera, video recorder, audio recorder, and/or DVR. The example content processor 250 is in communication between the content source 231 and an edge node 234 of the content distribution network 233, and is adapted to process media content, e.g., video, obtained from the content source 231 to obtain processed media content. The processed media content is provided to the one or more content consumers 232 via the content distribution network 233 in place of the originally received or captured media content. Accordingly, the processed media content is obtained from the content processor 250 before being distributed to the one or more content consumers 232, and in at least some embodiments, before transport of the processed media content from the edge node 234 to other communication nodes of the network 233. In at least some embodiments, one or more of the content source 231, the content processor 250 and/or the edge node 234 are adapted to prevent recording, distribution and/or presentation of the unmodified media content. It is envisioned that content consumers may include end users, e.g., receiving the processed media content according to a subscription, channel selection, order and/or request.

By way of example media content may include video content 235 as may be obtained from a video recorder, a streaming media source and/or a DVR, e.g., adapted to play previously recorded video data. The video content 235 generally includes a sequence of video frames, each video frame 236 including one or more objects of a scene captured by the video content 235 and observable within a presentation of the video content 235. The scene of the example video frame 236 includes a first person 237 located in a central, foreground region of the frame 236, a group of persons 240 located in a background portion along a right edge of the video frame 236, and an object 242 located towards an upper left portion of the video frame 236. The first person 237 can be further defined according to a head and/or facial portion 239, a body portion 238, and optionally, a badge, moniker and/or other distinguishable tag 243.

In more detail, the content processor 250 includes an analyzer 251, an orchestrator 252, and a rules engine 253. The analyzer is in communication with the content source 231, receiving at least a portion of the video content 235 therefrom. The analyzer 251 is adapted to analyze one or more aspects of the video content 235 to obtain analysis results. The analysis may include one or more of segmenting the video frame 236, distinguishing and/or otherwise identifying one or more objects within the video frame 236, identifying one or more features of the video frame 236, segments of the video frame 236 and/or objects within the frame. The features may include, without limitation, one or more of sizes, shapes, orientations, colors, shadows, arrangements, textures, motion or lack thereof, and so on.

In at least some embodiments, the rules engine 253 is in communication with one or more of the analyzer 251 and the orchestrator 252. The rules engine may include one or more predetermined rules and/or policies adapted to control and/or otherwise manage one or more of the analysis and/or adaptation of the video content 235 as disclosed herein, or otherwise generally known. By way of example, rules enforced by the rules engine 253 may identify one or more subjects of interest, e.g., according to individual identities, ages, occupations, roles, affiliations, and so on. Alternatively or in addition, rules enforced by the rules engine 253 may identify one or more adaptation parameters. The adaptation parameters may be implemented by one or more of the analyzer 251 and the orchestrator 252 to adapt at least a portion of the video content 235, e.g., at least a portion of one or more of the video frames 236, according to enforcement of the rules.

By way of further example, the analyzer may parse a video frame 236 into a foreground portion, e.g., including the first person 237, and a background portion, e.g., including the group of persons 240. A first rule may identify that any persons of minor age should be obfuscated and/or otherwise masked. The analyzer may separately analyze the first person 237 and the group of persons 240 according to the minor age requirement. To the extent any one of minor age is identified, a second rule may identify how to obfuscate such persons, e.g., face swap if the minor person is in the foreground and/or blur if the minor person(s) are in the background portion of the video frame 236.

The analyzer 251, the orchestrator 252 or a combination of both may implement the rules to obtain adapted, or modified video content 235', including modified video frames 236', each portraying corresponding scenic elements to the unmodified frames 236, but for application of any rules that may adapt one or more portions of the video frame 236'. According to the illustrative example, a head or facial portion 239 of the first person 237 of the original frame 236 has been replaced, e.g., according to a face swap, or convincing image replacement segments, adaptation providing an adapted head or facial portion 244 of the first person 237' of the modified video frame 236'. Other portions of the modified video frame 236', e.g., the object 242', the clothing 238' and/or any tag 243' may remain substantially unchanged from the original video frame 236.

According to the illustrative embodiment, the content processor 250 may include a storage element 254 in communication with one or more of the rules engine 253, the orchestrator 252 and/or the analyzer 251. The storage element 254 may be adapted to store one or more data elements related to processing of the video content 235, such as one or more rules, preferences, algorithms, temporary storage during generate of replacement content, and so on. Alternatively or in addition, the contextual synthetic media generation system 230 may include a user interface 255. The user interface 255 is shown as part of the content processor 250 and is in communication with one or more of the analyzer 251, the rules engine 253, the storage element 254 and/or the orchestrator 252. Alternatively or in addition, the user interface 255 may be provided at least partially within the content source, or as a separate device, e.g., a portal that may be accessible via the network 233.

In operation, the user interface 255 may be adapted to accept user input related to one or more of rules, preferences, managing authorization and/or access, e.g., to the content processor 250 and the like. In at least some embodiments, the user interface 255 may accept user input related to identification of any subjects of interest. User inputs may include preferences of any adaptations, e.g., whether blurring is applied, versus filtering and/or swapping of image portions. In at least some embodiments, user input may include a measure of reality to be applied during any adaptation. The example user interface includes a reality dial 257, which a user may adjust to obtain a desired level of reality with any adaptations, e.g., relatively low level of reality that may be easily identified by content consumers 232, versus a relatively high level of reality that may be indiscernible by the content consumers 232. It is understood that a system and/or process complexity may vary according to a selected reality level, e.g., with a greater level of processing power, storage, and/or other resources, such as AI resources being required to achieve a greater reality.

Figure 2C:
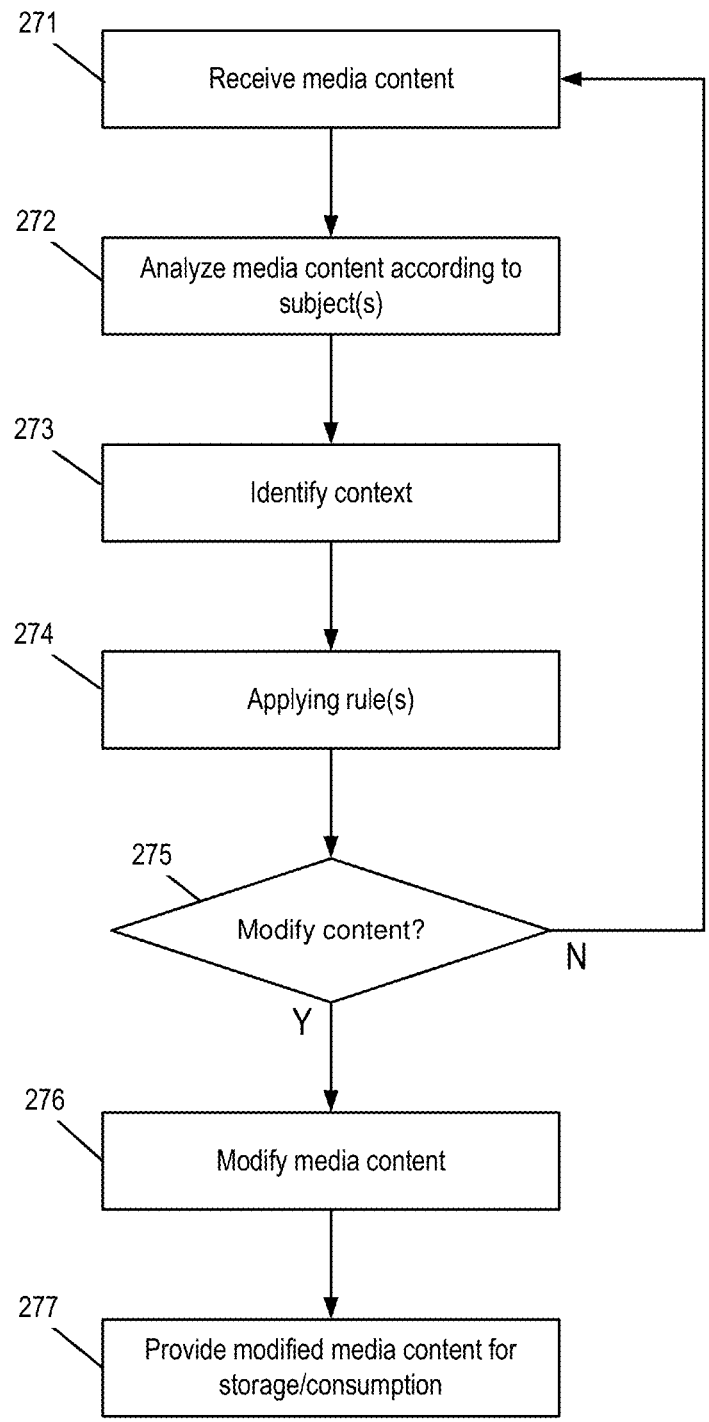
FIG. 2C depicts an illustrative embodiment of a process for contextual synthetic media generation in accordance with various aspects described herein.

FIG. 2C depicts an illustrative embodiment of a process 270 for contextual deep fake generation in accordance with various aspects described herein. According to the process 270, media content is received at 271. Without limitation, the media content may be received using one or more media processing devices, such as a camera, a video camera, an audio recorder, a smart phone, a tablet device, a personal computer, a smart television, a DVR, a personal digital assistant, and/or a smart speaker system, such as the Alexa® or Echo® smart speaker devices. The media content may include, without limitation, any of the various examples disclosed herein, such as digital images, video and audio. In at least some embodiments, the media content may be received from a media recording device, such as a camera, a video camera, a microphone and so on. Alternatively or in addition, the media content may be received from a playback of a media recording, e.g., from a DVR or audio recorder. Without limitation, the media content may also be received from a media broadcast, e.g., according to a live broadcast and/or a preprogrammed channel lineup, from an on-demand source, such as Netflix® or Hulu® on-demand services, from other streaming sources, such as YouTube® streaming media service.

Analyze media content according to subject(s) at 272. In at least some embodiments, the media content may be analyzed to identify one or more subjects of interest as may be present with them media content. A subject of interest may include one or more of persons, places and/or things. Any subjects of interest may be determined before or after analyzing the media content at 272. For example, a user may identify a subject of interest during a configuration of a media processing system adapted to perform at least a portion of the illustrative processing 270. Alternatively or in addition, the subject of interest may be determined according to a profile, and/or a configuration file, and/or by one or more rules to be applied to one or more of the processing steps of the illustrative process 270.

Identification of the subject of interest may apply generally understood image parsing, image interpretation, and/or image recognition algorithms. At least some of the algorithms may employ aspects of machine learning or AI. In at least some embodiments, identification of the subject of interest may apply a facial recognition algorithm, a voice recognition algorithm and/or a combination of both. It is understood that reference to a subject of interest may include specific subjects, such as a specific object or brand, e.g., a Coke® cola drink, a specific place, e.g., the U.S. Capital building, and or a specific person, e.g., President Biden. Alternatively or in addition, reference to a subject of interest may be more general. For example, a subject of interest may be a type of object, such as a soda can, a school building, a man, a child, a police officer, and so on.

According to the illustrative process 270, a context may be identified at 273. In at least some embodiments, contexts may refer to a subject matter of the media content, e.g., persons, places, things observable within a presentation of the media content. Alternatively or in addition, the context may relate to a manner in which the media content was captured, stored and/or otherwise accessed. For example, a context may indicate that the media content relates to a live event or a prerecorded event, or that the media content is unedited or edited, and so on. In at least some embodiments, contextual information may relate to one or more of a location or setting, an event, an individual person and/or group of persons of a subject matter of the media content and/or associated with generation, e.g., recording, of the media content.

Contextual information may be obtained automatically, e.g., as reported by equipment used to record and/or otherwise generate the media content. Example of such information may include geolocation reported by a GPS receiver of a smart phone, a temperature, barometric pressure, weather conditions, biometric data of individuals, e.g., heart rate, blood pressure, body temperature. Alternatively or in addition, contextual information may be reported by a user. The contextual information may be provided via a user interface. Alternatively or in addition, the contextual information may be provided by metadata associated with the media content. Users may include, without limitation, a user of the media processing device performing one or more steps of the illustrative process 270, a user involved with a recording, editing and/or production of the media content, and/or a content provider.

At least one rule ay be applied at 274. In at least some embodiments, the rule may be applied towards identification of a subject of interest. Alternatively or in addition, the rule may be applied towards adaptation of the media content. For example, the rule may relate to when the media content should be adapted and/or a manner in which the media content may be adapted. The rule may be based on at least a portion of the contextual information. For example, the rule may be configured to protect a news reporter when reporting from within a dangerous location. Accordingly, the rule may identify any news anchor of a particular news station or group of news stations, and/or a particular news correspondent or group of correspondents as subject matters of interest. The rule may identify further that any identified subjects of interest within the media content should be obfuscated, or otherwise adapted according to a convincing image replacement segment, only when present within a particular region, e.g., a war zone, or a hostile territory.

A determination is made at 275, as to whether the media content should be modified. Such a determination may be based upon detection of a subject of interest within the media content. Alternatively or in addition, such a determination may be based further upon a rule that sets a condition as to whether the media content should be modified. It is understood that at least some rules may apply to a nature of media modification, not necessarily setting any conditions as to when and/or whether the modification should be applied. To the extent it is determined at 275 that the content should not be modified, the process 270 proceeds to receive media content at 271. However, to the extent it is determined that the content should be modified, the media content is modified at 276.

Modification may include, without limitation, occlusion and/or blurring of at least a portion of an image, e.g., blurring a face, or a brand name. Alternatively or in addition, modification may include replacement of at least a portion of an image with a replacement image portion. For example, a face of a subject of interest may be replaced with a face of another. The replacement face may be of another individual and/or computer generated, e.g., determined according to an algorithm. In at least some embodiments, the process may include the user of machine learning and/or AI as disclosed herein. Similar techniques may be applied to audio portions of media content, e.g., modifying audio of a subject of interest with audio of another individual and/or according to an algorithm and/or AI technique. Advantageously, the replacement portions of an image, video and/or audio may be adapted to mask and/or otherwise prevent disclosure of the subject of interest.

In at least some embodiments, the modification may be obtained using one or more filters or algorithms. Such filters may be applied to at least a portion of the media content to an image, video and/or audio to obtain the modified media content item. Filters may be used to change one or more of a size, a resolution, a color and/or a tone of an image, a video and/or an audio of the media content. Other filters may be adapted to change an appearance of an individual, e.g., according to gender, race, ethnicity, height, weight, affiliation, occupation, and so on. Some filters may be adapted to change an appearance of a subject of interest according to an arbitrary or fanciful trait, e.g., replacing a person with a celebrity or an animated character. The modifications may be prescribed, e.g., according to the rules, to modify the media content in a directed manner. Alternatively or in addition, at least a portion of the modifications may be applied in a random manner, e.g., changing a trait, such as a skin tone, hair color, gender according to a randomized selection.

In at least some embodiments, the modified media content may be provided at 277 for storage and or consumption. In some applications, it may be advantageous to prevent storage, distribution and/or presentation of the original, unmodified media content. In this regard, steps may be implemented to ensure that the media modification occurs as close as possible to a source of the media content. For example, a media recorder adapted to generate or capture media content may be further adapted to modify the media content according to at least some of the various techniques disclosed herein. Alternatively or in addition, at least a portion of the modification of the media content may be accomplished by one or more other processing devices within a relatively close proximity to the media recorder, e.g., within a wireless range of a personal area network and/or a wired and/or wireless local area network. In at least some embodiments, modification of the media content may be accomplished within an edge node of a wide area network. Preferably the edge node is proximal, in a network sense, to the media recorder, to limit exposure of any unmodified media content to a minimum area, physical range and/or network range.

Figure 2D:
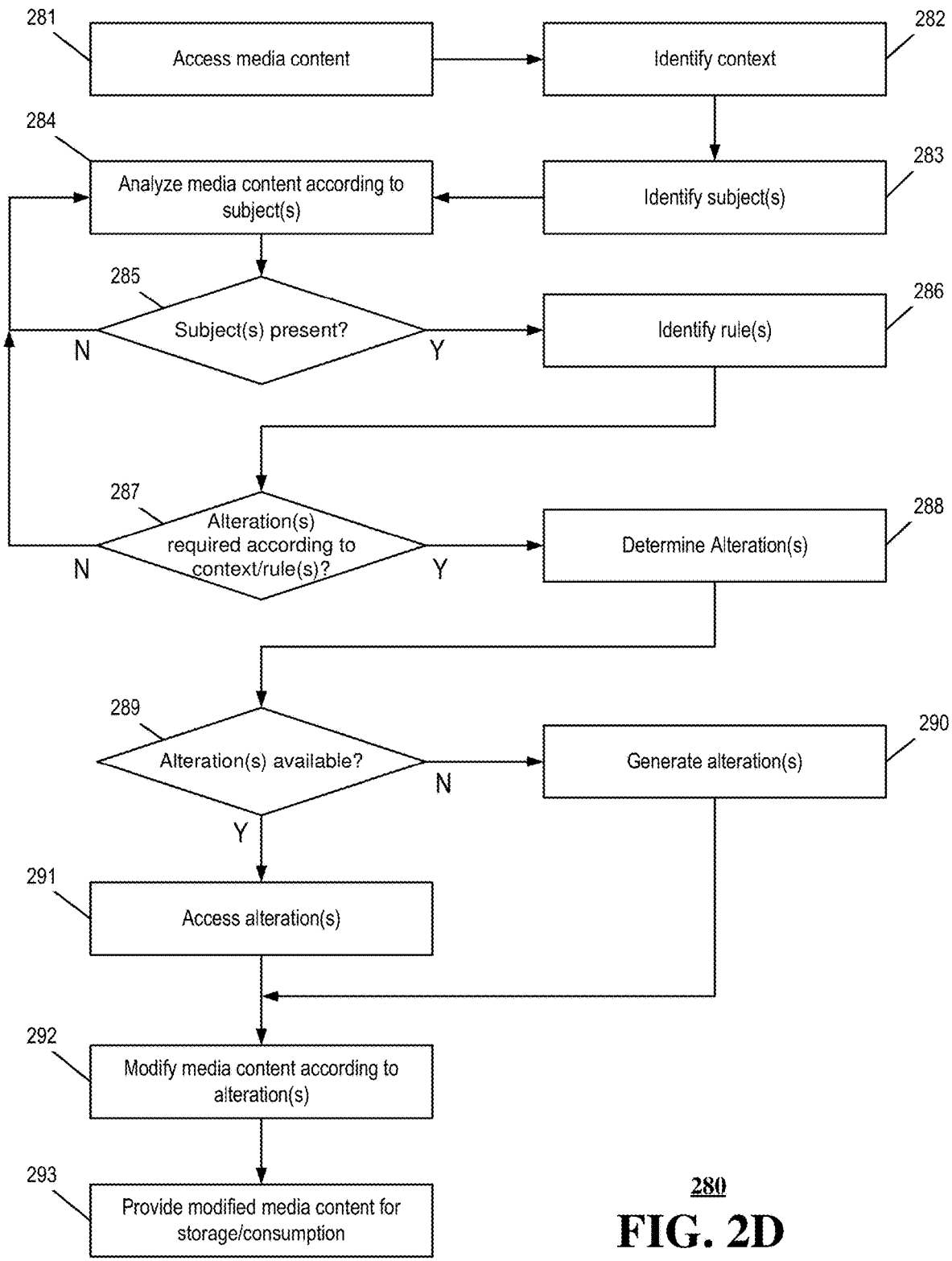
FIG. 2D depicts an illustrative embodiment of another process for contextual synthetic media generation in accordance with various aspects described herein.

FIG. 2D depicts an illustrative embodiment of another process 280 for contextual deep fake generation in accordance with various aspects described herein. According to the illustrative process, media content is accessed at 281, e.g., according to any of the various media access techniques disclosed herein. A context, such as any of the various examples disclosed herein is identified at 282 and a subject of interest is identified at 273. The media content is analyzed according to the subject of interest at 284, and a determination is made at 285 as to whether the subject of interest is present within the media content. To the extent it is determined that the subject of interest is not present, the process 280 proceeds to access media content at 281. However, to the extent it is determined that the subject of interest is present, a rule is identified at 286.

A determination is made at 287 as to whether an alteration of the media content is required according to the rule and, to the extent it is determined that an alteration is not required, the process 280 proceeds to access media content at 281. However, to the extent it is determined at 287 that an alteration is required, a detail of the alteration is determined at 288.

A further determination is made at 289 as to whether an alteration of the media content is available according to the detail. To the extent it is determined that an alteration according to the detail not available, an alteration is generated at 290 according to the detail. However, to the extent it is determined that the alteration according to the detail is available, the process accesses the alteration at 291. For example, if frames of a video segment are processed individually, the same subject may appear within at least a contiguous group of frames, or frames of a common scene of the media content, such that any adaptation may be accomplished in a similar manner, without necessarily having to determine the alterations and/or generate the alterations, instead utilizing alterations that may have already been determined and/or otherwise prepared during a processing of a preceding frame or frames. In either instance, the process 280 continues to modify the media content according to the alteration at 292, providing the modified media content for storage and or consumption at 293.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 100, 200, 230, 300 and processes 270, 280 presented in FIGS. 1, 2A, 2B, 2C, 2D and 3. For example, virtualized communication network 300 can facilitate in whole or in part obtaining, at a first location, media content that captures an occurrence of an event, analyzing the media content proximal to the first location to obtain an analysis result, determining a context of the event, applying a rule according to the context to obtain a rule application, modifying the media content according to the rule application to obtain a modified media content adapted for consumption by a media consumer at a second location, and preventing distribution of the media content for consumption by the media consumer.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

According to the illustrative example, the system 300 may include one or more virtual media processors 380, 381 in communication with one or more of the broadband access 110, the media access 140, the wireless access 120, and/or the content sources 175. The virtual media processors 380, 381 may be adapted to perform one or more of the processing steps disclosed herein in relation to processing of media content to determine a context of the media content, applying a rule according to the context, modifying the media content according to the application of the rule, and preventing a distribution of the unmodified media content. To this end, the virtual media processors 380, 381 may perform at least a portion of the processing steps that are distributed among another media processor, which may include one or more of the VNEs 330, 332, 334, and/or one or more of the broadband access 110, the media access 140, the wireless access 120, and/or the content sources 175, that may be adapted to include one or more media processing components 382, 386, 384, 390 adapted to work independently and or in cooperation with one another and/or with one or both of the virtual media processors 380, 381 to perform one or more of the processing steps disclosed herein in relation to processing of media content to determine a context of the media content, applying a rule according to the context, modifying the media content according to the application of the rule, and preventing a distribution of the unmodified media content.

Figure 4:
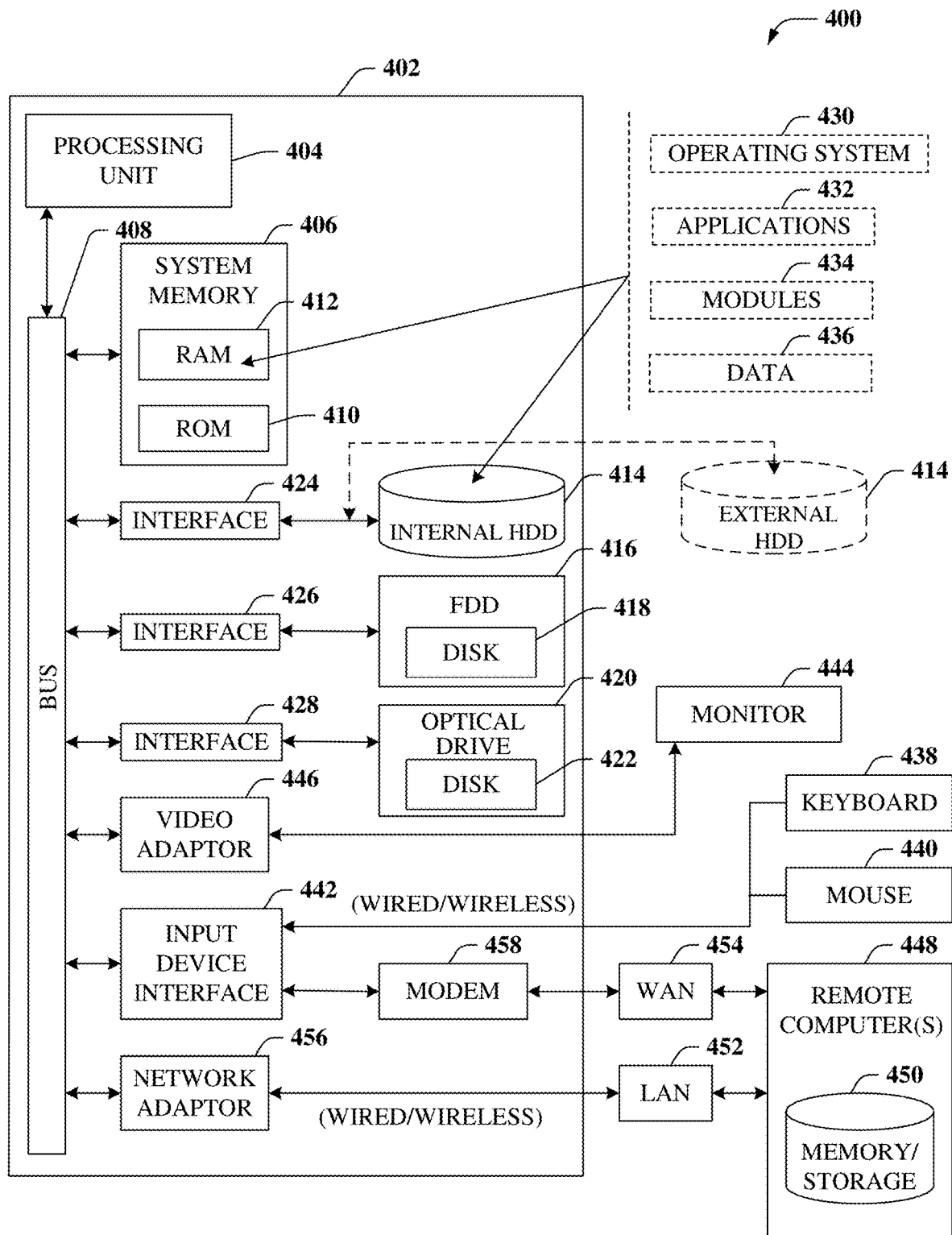
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining, at a first location, media content that captures an occurrence of an event, analyzing the media content proximal to the first location to obtain an analysis result, determining a context of the event, applying a rule according to the context to obtain a rule application, modifying the media content according to the rule application to obtain a modified media content adapted for consumption by a media consumer at a second location, and preventing distribution of the media content for consumption by the media consumer.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
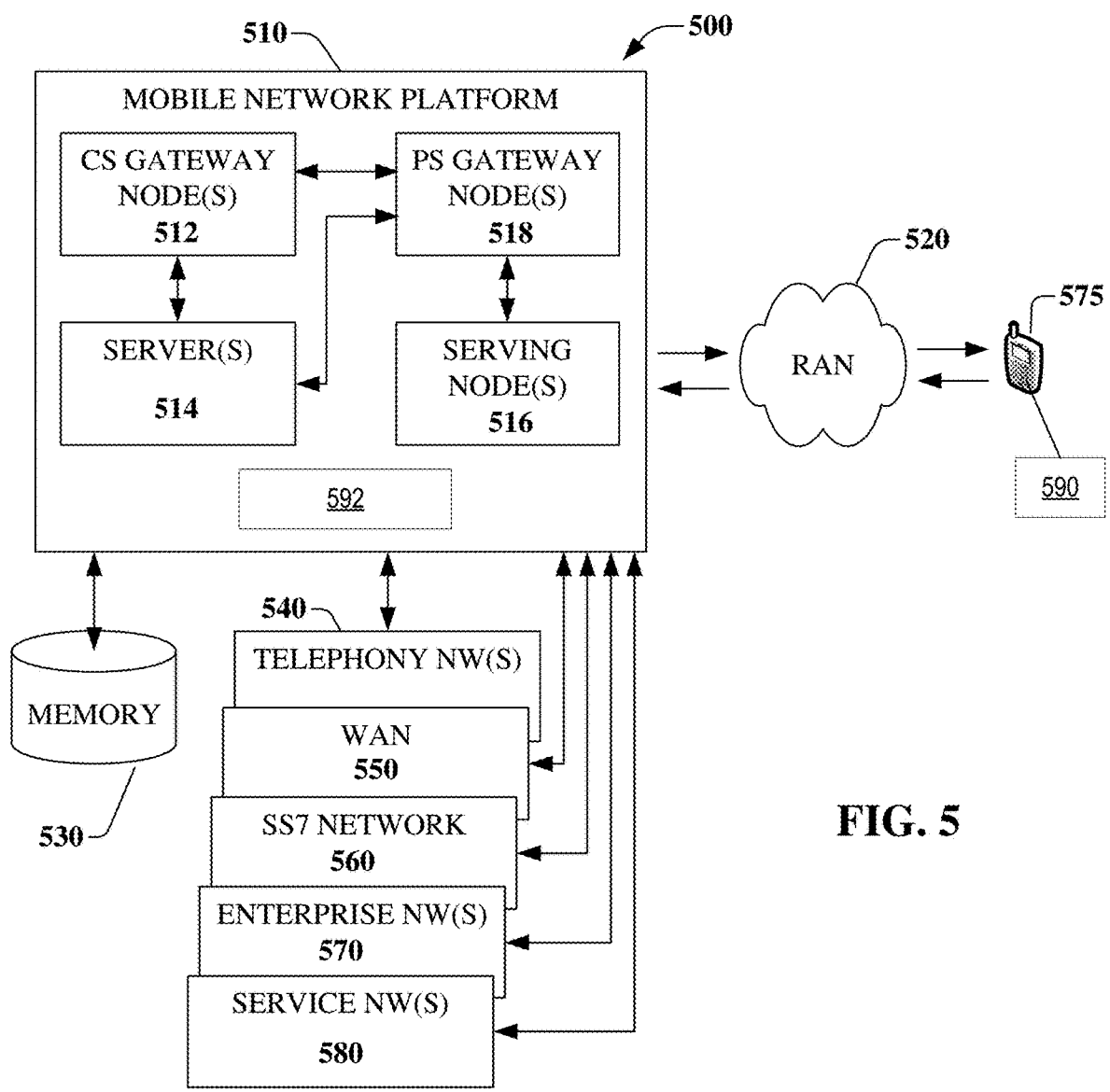
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining, at a first location, media content that captures an occurrence of an event, analyzing the media content proximal to the first location to obtain an analysis result, determining a context of the event, applying a rule according to the context to obtain a rule application, modifying the media content according to the rule application to obtain a modified media content adapted for consumption by a media consumer at a second location, and preventing distribution of the media content for consumption by the media consumer. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In at least some embodiments, the mobile device 576 may include a module, application and/or executable instructions 590, adapted for obtaining media content, and/or analyzing the media content, and/or determining a context of an event portrayed in the media content, and/or applying a rule according to the context, and/or modifying the media content according to the rule, and/or preventing distribution of the media content for consumption by a media consumer at a second location remote from the first location. Alternatively or in addition, the mobile network platform 510 may include a module, application and/or executable instructions 592, adapted for obtaining media content, and/or analyzing the media content, and/or determining a context of an event portrayed in the media content, and/or applying a rule according to the context, and/or modifying the media content according to the rule, and/or preventing distribution of the media content for consumption by a media consumer at a second location remote from the first location. It is envisioned that the example modules 590, 592 may work independent and/or cooperatively, e.g., distributing processing according to one or more of processing capacity, storage capacity, power consumption, battery power reserve, network conditions, and the like.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
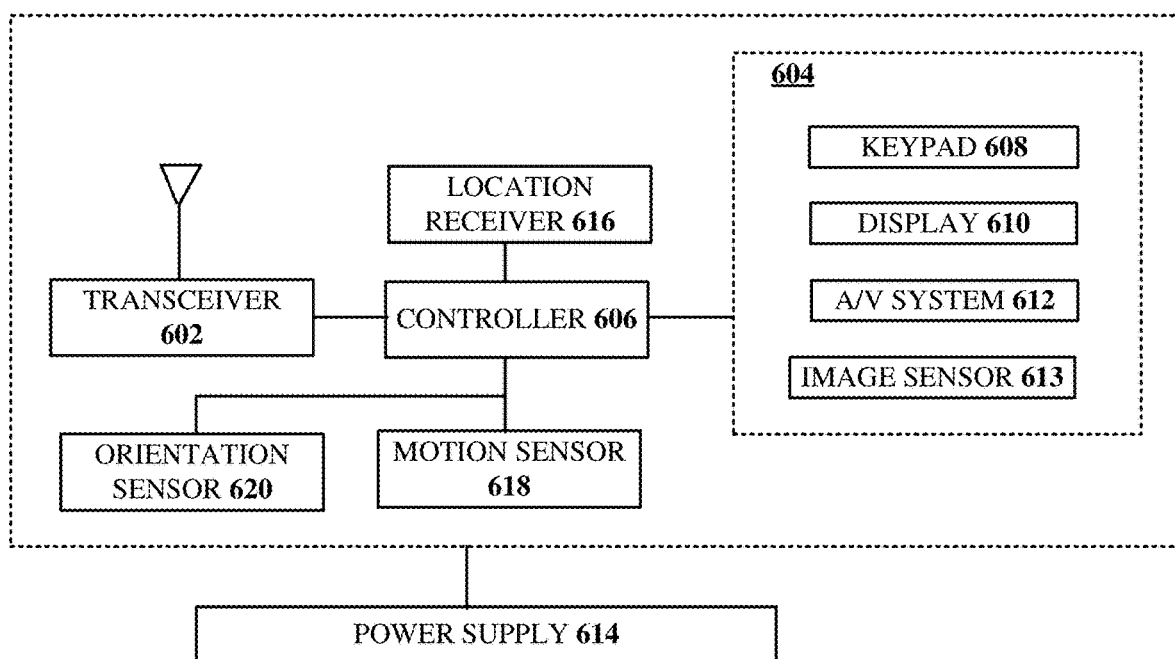
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining, at a first location, media content that captures an occurrence of an event, analyzing the media content proximal to the first location to obtain an analysis result, determining a context of the event, applying a rule according to the context to obtain a rule application, modifying the media content according to the rule application to obtain a modified media content adapted for consumption by a media consumer at a second location, and preventing distribution of the media content for consumption by the media consumer.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The media analysis and adaptation techniques disclosed herein may be applied at production time, e.g., for marketing/ad material (fast turnaround for stuntman or marketing video). For example, a generic advertising and/or marketing scene may be recorded, but regionalize and/or modified for particular intended purposes. Scenes may use body double for actual shots and replace individuals with other identities as desired. Consider a recorded video scene of kayakers, in which images of persons captured in the originally recorded scene may be replaced with different personas, possibly even younger versions of those captured in the recording. Other adaptations may include gender and/or ethnicity, while preserving features such as body positions, actions and/or general appearance. In at least some embodiments, a predetermined list of entities to be adapted, e.g., a "block list" and/or an "opt-in" list, as the case may be.

Identities may be contextually discovered, e.g., by geo-location, by assignment and/or role. For example a media adaptation system may infer a dangerous and/or sensitive place, e.g., wartime, military facility, government installation, corporate environment, laboratory, elementary school. Having determined the media was obtained from a sensitive location, other rules may be applied to determine what to adapt, modify or block and/or what may be permitted, in which instance the adaptation, modification and/or blocking would be applied to those aspects of the media content not permitted. A scenario may include one/more as persons who should not be blocked, e.g., according to the rules, in which instance the adaptation system would automatically block anyone else who may have been captured within the media content. Others may be selectively blocked, e.g., based on gender, ethnicity, age, uniform, etc. In at least some embodiments, analysis of captured media content may be adapted to detect a token, e.g., a news moniker as may be worn by a reporter, or attached to a microphone held by a reporter. Such monikers, when detected may as in indication of who/what should or should not be adapted, modified and/or otherwise blocked.

It is envisioned that the media adaptation techniques disclosed herein may be used to preserve privacy and/or to offer protection to persons, places and/or entities who may be captured in media content. Alternatively or in addition, the techniques may be applied in a context of moderation, e.g., to detect violence, or scary content that could be blocked according to the rules, perhaps applied according to a graded application, e.g., according to an age of an intended media consumer, with more being blocked according to younger age groups. Still other applications include brand safety, in which an advertiser and/or sports team may not want their spokesperson seen drinking alcohol. Accordingly, the adaptations may be applied to anonymize such individuals according to detected activities, e.g., according to predetermined rules.

In at least some applications, the adaptation techniques may be applied according to a timing rule that may depend upon a time of day, a date, a duration, an age and so on. By way of example, an identity captured within a media content item may be associated with a time-to-live, such as an expiring identity, in which instance, the identity may be adapted and/or not adapted according to the timing rule. Alternatively or in addition, the timing rule may apply to the adaptation, e.g., replacing a face of a president recorded in a previous administration with a face of a president of the current administration. Similar to time sensitive rules, other rules may relate to events. For example in a sporting game, an identity of a real athlete portrayed in a game may be adapted based on a trade, a retirement, and so on, in order to maintain a freshness of the game relevance. Consider a baseball scenario in which a team, e.g., the Yankees recorded generated in one era, but certain individuals may be replaced with caricatures, and/or more current and/or relevant players of a later/earlier era—e.g., substitute Babe Ruth or Lou Gehrig for Aaron Judd. Still other timing and/or event-based rules may be used in relation to advertising in general or to movies, e.g., replacing brands and/or an actor(s) to keep movies/tv series relevant/fresh.

In at least some embodiments, the techniques disclosed herein may be applied to media content that includes, without limitation, at least portions of one or more of an image, a video frame, 3D images and/or 3D video, including media content represented by voxels, and/or audio. Images and/or video content may include extended range content, such as those used in panoramic applications and/or, so-called, 360-video applications. The media content subject to and/or produced by the various techniques disclosed herein may be obtained from and/or otherwise adapted for use in coordination with one or more of virtual reality (VR) applications, extended reality (XR) applications, augmented reality (AR) applications, diminished reality (DR) applications, gaming applications, cinematic presentations, media recording applications, e.g., DVR, broadcast applications, video-on-demand applications, streaming applications, live broadcast and/or live streaming applications, and so on.

In at least some embodiments, media capture and/or media processing devices may include wearable device VR/AR that may be applied in a collaborative environment, e.g., a meeting, in which an individual may be wearing an AR headset, but does not want to appear as such to other participants/audience members. Some social media platforms use an Avatar Codec, in which an inward looking camera observes a user's mouth, eyes etc., to extract local features from VR headset. It is envisioned that similar techniques may be utilized according to the techniques disclosed herein, e.g., using an Avatar Codec, to encode faces adjacent to the recording camera, but not do the full processing, defer that to edge or elsewhere that has more computer power.

In at least some embodiments, application of a convincing image replacement segment may apply preferences and/or rules, e.g., to have an individual blend in with a crowd. The analyzer may review a crowd to determine one or more generalized characteristics, e.g., gender, race, ethnicity, age, affiliations, then define changes to be applied to one or more subjects of interest based on same.

In at least some embodiments, a media adaptation system according to the techniques disclosed herein may be configured to permit modifications (a "dial"), by a participant, e.g., one being recorded, an observer, a third party, some combination thereof. Similarly, a person and/or AI may be applied in the loop, to provide and/or otherwise assist in any of the processing steps disclosed herein in relation to the disclosed adaptation techniques.

In at least some embodiments, a user purchase of a non-fungible token (NFT) may be associated with a view of a video and/or news item in which a purchaser purchases the original and/or an original modification, such that access is constrained and/or changed according to one NFT. For example, a rough cut of a video may be preserved as an NFT.

In at least some embodiments, the analysis may identify an individual and provide a query to the individual, e.g., via SMS, and/or social media, indicating that they've been tagged in a particular recording and requesting whether they prefer to remain in the recording or to be replaced, e.g., "faked." The adaption rules may be adapted to initiate the query and to modify and/or otherwise configure any subsequent adaptation responsive to a response to the inquiry. A default rule may be established to provide that in the absence of a reply, the individual will be faked.

In at least some embodiments, media adaptation or convincing replacement of media segments, encompasses audio as well. For example, the adaptation rules may be configured to apply a voice changing to a voice of a recognized image and/or recognized voice, and/or metadata. The voice adaptation may apply a pitch shift to anonymize the individual. Alternatively or in addition, the adaptation may be configured to simulate a voice based on an image of a person, e.g., a synthesized voice and/or audio characteristic of a representative mature, white female may replace the actual voice of a mature white female to anonymize the voice alone or in addition to an anonymizing of the person or face.

In at least some embodiments, the techniques disclosed herein may be applied to adapt and/or otherwise replace a background scene of an image, a background of a video scene and/or background audio, e.g., crowd noise, environment noise, a soundtrack, and the like.

In one or more embodiments, any and all modifications may be performed according to applicable laws, rules, regulations, permissions, digital rights management (DRM) policies, authorizations, and so forth.

U.S. Pat. No. 10,810,324, entitled "Methods, Systems and Algorithms for Providing Anonymization", and directed to anonymization that may be provided such as to implement, for example, privacy as a service, is incorporated herein in its entirety.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    recording, by a processing system comprising a processor at a first location, original media content of a live event;
    analyzing, by the processing system, the original media content proximal to the first location to obtain an analysis result;
    identifying, by the processing system, a context of the live event;
    applying, by the processing system, a rule proximal to the first location according to the context to obtain a rule application;
    modifying, by the processing system, the original media content proximal to the first location according to the rule application to obtain modified media content adapted for distribution to media consumers; and
    preventing, by the processing system, distribution of the original media content for consumption by the media consumers.

2. The method of claim 1, wherein the original media content further comprises one of an image, a video, audio, or any combination thereof.

3. The method of claim 1, wherein the original media content further comprises one of virtual reality content, extended reality content, augmented reality content, diminished reality content, three-dimensional content, or any combination thereof.

4. The method of claim 1, wherein the analyzing the original media content further comprises:
    identifying, by the processing system, a subject of interest within the original media content, the subject of interest portrayable according to a presentation of the original media content.

5. The method of claim 4, wherein subject of interest comprises a face.

6. The method of claim 1, wherein the identifying the context further comprises:
    determining, by the processing system, a context of the first location.

7. The method of claim 6, wherein the context of the first location comprises an activity associated with the first location.

8. The method of claim 1, wherein the identifying the context further comprises:
    determining, by the processing system, a person, or a group according to the original media content.

9. The method of claim 8, wherein the determining the person, or the group further comprises:
    determining, by the processing system, an identity of a subject of interest of the original media content, the subject of interest portrayable according to a presentation of the original media content.

10. The method of claim 1, wherein the rule application further comprises:
    determining, by the processing system, a modification requirement, wherein the original media content is modified according to the modification requirement.

11. The method of claim 10, wherein modifying the original media content further comprises:
    obfuscating, by the processing system, a representation of a subject of interest to obtain an obfuscated subject of interest, the obfuscated subject of interest portrayable according to a presentation of the modified media content.

12. A media processing system, comprising:
    a processing system including a processor; and
    a memory that stores executable instructions that, when executed by the processing system, facilitate performance of operations, the operations comprising:
        generating, at a source location, media content capturing an event occurring at the source location;
        analyzing the media content proximal to the source location to obtain an analysis result;
        identifying a context of the event;
        applying a rule proximal to the source location according to the context to obtain a rule application;
        modifying the media content proximal to the source location according to the rule application to obtain modified media content adapted for distribution to media consumers; and
        preventing distribution of the media content to the media consumers.

13. The media processing system of claim 12, wherein the media content further comprises one of an image, a video, audio, or any combination thereof.

14. The media processing system of claim 12, wherein the analyzing the media content further comprises:
    identifying a subject within the media content, the subject portrayable according to a presentation of the media content.

15. The media processing system of claim 14, wherein subject comprises a person, a place, a thing, or any combination thereof.

16. The media processing system of claim 14, wherein subject comprises a face.

17. The media processing system of claim 12, wherein the identifying the context further comprises:
    determining an activity associated with the source location.

18. A non-transitory, machine-readable medium, comprising executable instructions that, when executed by a processing system including a processor, facilitate performance of operations, the operations comprising:
    obtaining, at a first location, media content capturing an event occurring at a capture location;
    analyzing the media content proximal to the first location to obtain an analysis result;
    determining a context of the event;
    applying a rule according to the context to obtain a rule application, wherein the media content is modified according to the rule application to obtain a modified media content adapted for distribution to a media consumer at a second location; and
    preventing distribution of the media content for consumption by the media consumer.

19. The non-transitory, machine-readable medium of claim 18, wherein the media content further comprises one of an image, a video, audio, or any combination thereof.

20. The non-transitory, machine-readable medium of claim 18, wherein the analyzing the media content further comprises identifying a subject within the media content, the subject portrayable according to a presentation of the media content.

* * * * *